(12) United States Patent
Miyahara et al.

(10) Patent No.: US 10,486,111 B2
(45) Date of Patent: Nov. 26, 2019

(54) SEPARATION MEMBRANE STRUCTURE (71) Applicant: NGK INSULATORS, LTD., Nagoya-Shi (JP)

(72) Inventors: Makoto Miyahara, Nagoya (JP); Kenichi Noda, Nagoya (JP); Makiko Ichikawa, Nagoya (JP); Takeshi Hagio, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/494,980

(22) Filed: Apr. 24, 2017

(65) Prior Publication Data

US 2017/0225129 A1    Aug. 10, 2017

Related U.S. Application Data

(63) Continuation of application No. PCT/JP2015/082419, filed on Nov. 18, 2015.

(30) Foreign Application Priority Data

Nov. 25, 2014 (JP) ................. 2014-237813

(51) Int. Cl.
*B01D 71/02* (2006.01)
*B01D 69/12* (2006.01)
(Continued)

(52) U.S. Cl.
CPC ....... *B01D 71/028* (2013.01); *B01D 67/0046* (2013.01); *B01D 69/02* (2013.01);
(Continued)

(58) Field of Classification Search
CPC ................................ B01D 53/228; B01D 67/0051; B01D 69/125; B01D 71/022; B01D 71/028; C01B 39/14; C01B 39/38; C01B 39/46
See application file for complete search history.

(56) References Cited

U.S. PATENT DOCUMENTS 6,031,116 A * 2/2000 Bowman ................. B01J 23/50
549/523
6,037,292 A * 3/2000 Lai ....................... B01D 71/028
502/4
(Continued)

FOREIGN PATENT DOCUMENTS

CN    103635248 A    3/2014
JP    2002-263456 A1    9/2002
(Continued)

OTHER PUBLICATIONS

Beving, Derek E. et al., "Hydrophilic and antimicrobial low-silica-zeolite LTA and high-silica-zeolite MFI hybrid coatings on aluminum alloys", Microporous and Mesoporous Materials, 108, 2008, pp. 77-85. (Year: 2008).*
(Continued)

*Primary Examiner* — Jason M Greene
(74) *Attorney, Agent, or Firm* — Burr & Brown, PLLC (57) ABSTRACT

A separation membrane structure includes a porous support, a first separation membrane and a second separation membrane. The first separation membrane is formed on the porous support and contains high silica zeolite having Si/Al atomic ratio of greater than or equal to 200. The second separation membrane is formed on the first separation membrane and contains cation.

5 Claims, 3 Drawing Sheets

CROSS SECTIONAL HAADF IMAGE ON OF SEPARATION MEMBRANE IN SAMPLE NO. 1.

(51) Int. Cl.
*C01B 39/38* (2006.01)
*C01B 39/46* (2006.01)
*B01D 67/00* (2006.01)
*B01D 69/02* (2006.01)
*C01B 39/14* (2006.01)

(52) U.S. Cl.
CPC ........... *B01D 69/12* (2013.01); *B01D 69/125* (2013.01); *B01D 71/022* (2013.01); *C01B 39/14* (2013.01); *C01B 39/38* (2013.01); *C01B 39/46* (2013.01); *B01D 71/027* (2013.01); *B01D 2325/04* (2013.01); *B01D 2325/16* (2013.01)

(56) References Cited

U.S. PATENT DOCUMENTS

| | | | | |
|---|---|---|---|---|
| 7,252,876 | B2* | 8/2007 | Mori | B01D 71/028 210/506 |
| 2001/0020416 | A1* | 9/2001 | Yoshikawa | B01D 71/028 95/45 |
| 2003/0228969 | A1* | 12/2003 | Dong | B01D 71/028 502/4 |
| 2004/0173094 | A1 | 9/2004 | Nakayama et al. | |
| 2005/0229779 | A1 | 10/2005 | Nakayama et al. | |
| 2007/0068382 | A1 | 3/2007 | Ku et al. | |
| 2007/0112189 | A1 | 5/2007 | Ikeda et al. | |
| 2014/0174290 | A1 | 6/2014 | Sawamura et al. | |
| 2014/0208707 | A1 | 7/2014 | Teranishi et al. | |
| 2015/0273401 | A1* | 10/2015 | Miller | B01D 71/028 210/500.25 |
| 2015/0321141 | A1* | 11/2015 | Tang | B01D 71/028 96/6 |
| 2015/0329563 | A1 | 11/2015 | Kishida et al. | |

FOREIGN PATENT DOCUMENTS

| | | |
|---|---|---|
| JP | 2004-066188 A | 3/2004 |
| JP | 2005-145773 A1 | 6/2005 |
| JP | 2009-509747 A1 | 3/2009 |
| JP | 2009-208047 A1 | 9/2009 |
| JP | 2009-233608 A1 | 10/2009 |
| JP | 2010-120834 A1 | 6/2010 |
| JP | 2012-236155 A1 | 12/2012 |
| JP | WO2013/054794 A1 | 4/2013 |
| JP | 2013-226535 A1 | 11/2013 |
| WO | 2014103778 A1 | 7/2014 |

OTHER PUBLICATIONS

Derek E. Beving, et al., "Hydrophilic and Antimicrobial Low-Silica-Zeolite LTA and High-Silica-Zeolite MFI Hybrid Coatings on Aluminum Alloys," *Microporous and Mesoporous Materials*, vol. 108, 2008, pp. 77-85.
International Search Report and Written Opinion (Application No. PCT/JP2015/082419) dated Jan. 12, 2016.
English translation of Written Opinion (Application No. PCT/JP2015/082419) dated Jun. 8, 2017.
Li, Qinghua, et al. "Synthesis and characterization of zoned MFI films by seeded growth," Microporous and Mesoporozis Materials, vol. 56, dated Dec. 31, 2002, pp. 291-302 (12 pages).
Japanese Office Action (and English Translation obtained from the Global Dossier) from a corresponding Japanese patent application (JP 2016-561525) dated Sep. 17, 2019, 6 pages.

* cited by examiner

SEM IMAGE OF HIGH SILICA MFI-TYPE ZEOLITE
MEMBRANE SURFACE IN SAMPLE NO. 1.

FIG. 3

SEM IMAGE OF LOW SILICA MFI-TYPE ZEOLITE
MEMBRANE SURFACE IN SAMPLE NO. 1.

CROSS SECTIONAL HAADF IMAGE ON OF SEPARATION MEMBRANE IN SAMPLE NO. 1.

FIG. 4 ions or separation of a target component from a mixed fluid (liquid mixture or gas mixture) that is an object for separation (For example, reference is made to PCT International Publication No. WO 2013/054794).

SUMMARY OF INVENTION

Technical Problem

Although the zeolite membrane must have a thin membrane configuration in order to enhance permeation performance, when the zeolite membrane is formed on the porous support, the separation performance is reduced due to the tendency for defects in the zeolite membrane as a result of the thin membrane configuration.

Consequently, the above ceramic filter is provided only with one type of zeolite membrane and therefore cannot separately control permeation performance and separation performance in the zeolite membrane and has difficulty in relation to enabling both satisfactory permeation performance and separation performance.

Although the separation performance can be enhanced by including a predetermined cation in the separation membrane to thereby enhance the adsorption characteristics of the permeation component, since adsorption becomes excessively strong if the separation membrane is excessively thick, it may be the case that permeation performance is reduced.

The present invention is proposed based on the insight above, and has the object of providing a separation membrane structure that is configured to enable both satisfactory permeation performance and separation performance.

Solution to Problem

The separation membrane structure according to the present invention comprises a porous support, a first separation membrane formed on the porous support, and a second separation membrane formed on the first separation membrane. The first separation membrane contains high silica zeolite having Si/Al atomic ratio of greater than or equal to 200. The second separation membrane contains cation.

Advantageous Effects of Invention

According to the present invention, it is possible to provide a separation membrane structure that is configured to enable both satisfactory permeation performance and separation performance.

DETAILED DESCRIPTION OF THE INVENTION

An embodiment of the present invention will be described below making reference to the figures. Those aspects of configuration in the following description of the figures that are the same or similar are denoted by the same or similar reference numerals. However, the figures are merely illustrative, and the actual ratios or the like of the respective dimensions may differ. Therefore, the specific dimensions or the like should be determined by making reference to the following description. Alternatively, it is naturally the case that portions are included that exhibit a different ratio or relationship between dimensions in the respective figures.

Configuration of Separation Membrane Structure 10

Figure 1:
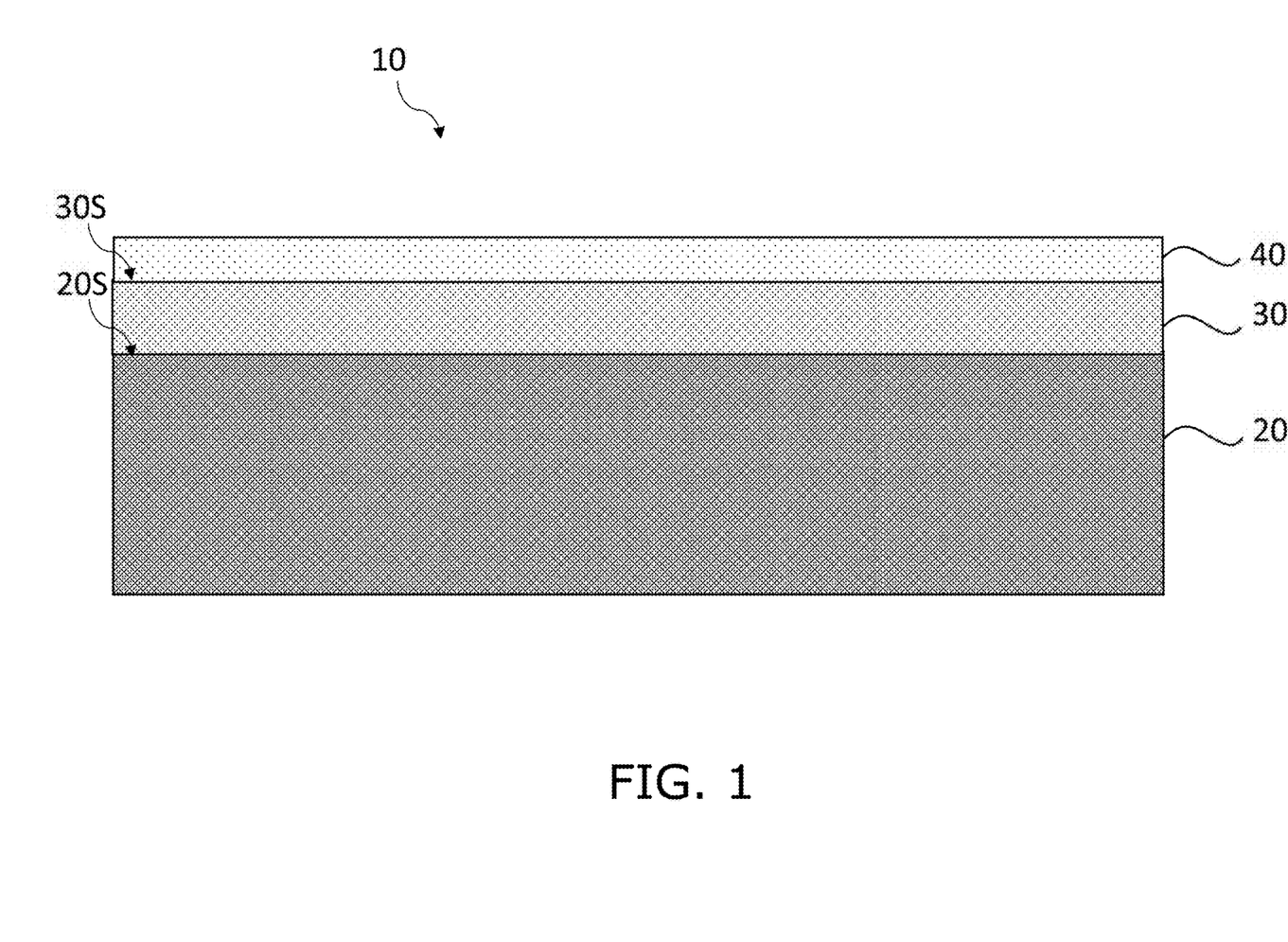
FIG. 1 is a cross-sectional view of a separation membrane structure.

FIG. 1 is a cross-sectional view of a separation membrane structure 10. A separation membrane structure 10 includes a porous support 20, a first separation membrane 30, and a second separation membrane 40.

The porous support 20 supports the first separation membrane 30 and the second separation membrane 40. The porous support 20 exhibits chemical stability to enable formation (crystallization or precipitation) of the first separation membrane 30 and the second separation membrane 40 on a surface.

The material constituting the porous support 20 includes for example, a sintered ceramic, a metal, an organic polymer, glass, carbon or the like. The ceramic sintered includes alumina, silica, mullite, zirconia, titania, yttria, silicon nitride, silicon carbide, or the like. The metal includes aluminum, iron, bronze, stainless steel, or the like. The organic polymer includes polyethylene, polypropylene, polytetrafluoroethylene, polysulfone, polyimide or the like.

The porous support 20 may be configured in a shape to enable supply to the first separation membrane 30 and the second separation membrane 40 of a mixed fluid (gas mixture or liquid mixture) that is the object to be separated. The shape of the porous support 20 for example may be configured in a honeycomb, monolithic, flat, tubular, cylindrical, columnar, or square column shape. However there is no limitation in this regard.

The porous support 20 is a porous body that has a plurality of pores. The average pore diameter of the porous support 20 may be any size that enables transmission of a permeation component of the object to be separated that permeates the first separation membrane 30 and the second separation membrane 40. When the open pore diameter of the porous support 20 takes larger values, there is a tendency for the permeation amount of the permeation component to increase. When the pore diameter takes smaller values, the strength of the porous support itself is increased and there is a tendency for the formation of a dense first separation layer 30 due to the flat configuration of the surface of the porous support.

The porous support 20 may be a single-layered structure having the same open pore diameter or a multilayered structure having different open pore diameters. When the porous support 20 is a multilayered structure, each layer may be composed of different materials from among the materials described above or may be composed of the same material.

The first separation membrane 30 is formed on the surface 20S of the porous support 20. When the porous support 20 is formed in a honeycomb or monolithic shape, the first separation membrane 30 is formed on the inner side of the respective plurality of through holes provided in the porous support 20.

The first separation membrane 30 contains zeolite (high silica zeolite) having Si/Al atomic ratio of greater than or equal to 200. This type of high silica zeolite substantially contains little or no aluminum. A high silica zeolite exhibits characteristics such as high durability and few surface defects. Consequently, the first separation membrane 30 is provided with chemical stability and a uniform average pore diameter, and functions as a base layer for the second separation membrane 40. The Si/Al atomic ratio in the high silica zeolite in the first separation membrane 30 may be adjusted by controlling the formulation of the starting material solution during hydrothermal synthesis as described below. The Si/Al atomic ratio of the high silica zeolite in the first separation membrane 30 can be measured by SEM-EDX (scanning electron microscope energy dispersive X-ray spectroscopy).

In the present embodiment, the term such that composition X "contains as a principal component" substance Y means that substance Y occupies greater than or equal to 60 wt %, and preferably occupies greater than or equal to 70 wt % and more preferably occupies greater than or equal to 90 wt % of the total of composition X.

There is no particular limitation in relation to the backbone structure (type) of the high silica zeolite contained in the first separation membrane 30 and, for example includes MFI, LTA, CHA, DDR, MOR, DOH, FAU, OFF/ERI, LTL, FER, BEA, BEC, CON, MSE, MEL, MTW, MEI, MWW, RHO, BOG, SZR, EMT, SOD, AEI, AEL, AEN, AET, AFN, AFO, AFR, AFS, AFT, AFI, AFX, ANA, CAN, GIS, GME, HEU, JBW, KFI, LAU, LEV, MAZ, MER, MFS, MTT, PHI, SFG, TUN, TON, UFI, VET, VFI, VNI, and VSV or the like. In particular, MFI, DDR, MEL, BEA, CHA are preferred due to ease of preparation of a membrane having a high silica structure with few defects.

The first separation membrane 30 may contain an inorganic binder such as silica or alumina, or the like, an organic binder such as a polymer or the like, or a silylating agent or the like in addition to the high silica zeolite described above.

The first separation membrane 30 is formed into a membrane shape. There is no particular limitation in relation to the thickness of the first separation membrane 30 and for example it may be 0.1 micrometers to 10 micrometers. When the first separation membrane 30 has a thin configuration, there is a tendency for the permeation amount to increase, and when the first separation membrane 30 has a thick configuration, there is a tendency for the selectivity and membrane strength to be enhanced. However, when the first separation membrane 30 has an excessively thin configuration, cracks are produced in the membrane and selectivity may be reduced.

The first separation membrane 30 includes pores. There is no particular limitation in relation to the average pore diameter of the first separation membrane 30 and it can be adjusted according to the object to be separated.

When in zeolite membrane configuration, the pore diameter is a value derived from the composition and backbone structure. When in zeolite membrane configuration, the average pore diameter is taken to be the arithmetic mean of the long diameter and short diameter of the largest pore in a pore structure of at least an oxygen 8-membered ring that is present in the backbone structure. The average pore diameter may be for example 0.2 nanometers to 2.0 nanometers.

When in a silica membrane or carbon membrane configuration, the average pore diameter can be adjusted by the starting material particle diameter or the heating temperature. The average pore diameter can be measured using a nano-perm porometer. The average pore diameter may be for example 0.2 nanometers to 5.0 nanometers.

The second separation membrane 40 is formed on a surface 30S of the first separation membrane 30. The second separation membrane 40 contains at least one type of cation selected from the group consisting of alkali metals, alkaline earth metals, Au, Ag, Cu, Ni, Co, Pd and Pt. The type of cation may be selected in response to the function to be imparted to the second separation membrane 40.

For example, when causing permeation of ethylene or propylene, the adsorption characteristics of the permeation component can be enhanced by including an Ag cation in the second separation membrane 40 (low silica MFI-type zeolite, or low silica BEA-type zeolite, or the like). When causing permeation of carbon dioxide, it is preferred that Li or Cs cation is included in the second separation membrane 40 (low silica DDR-type zeolite, or the like). When causing permeation of oxygen, it is preferred that a Co complex cation is included in the second separation membrane 40 (low silica MFI-type zeolite, or the like). When causing permeation of hydrogen, it is preferred that a Pd, Ni, or Cu cation is included in the second separation membrane 40 (low silica DDR-type zeolite, or the like). In this manner, the separation performance of the separation membrane structure 10 can be enhanced.

The cation can be introduced into the second separation membrane 40 by ion exchange after membrane formation as described below. Furthermore, the cation may be introduced simultaneously with membrane formation of the second separation membrane 40.

The second separation membrane 40 by contain cation as described above, or may include a principal component as an inorganic material such as zeolite, carbon, silica, organic silica or the like. The second separation membrane 40 preferably includes a principal component of zeolite (low silica zeolite) having a smaller Si/Al atomic ratio than the high silica zeolite contained in the first separation membrane 30. It is particularly preferred to use low silica zeolite having Si/Al atomic ratio of less than or equal to 60. It is possible to enhance the separation performance of the separation membrane structure 10 by configuring the zeolite with a uniform pore diameter.

The separation performance of the separation membrane structure 10 can be enhanced by a configuration since Si/Al atomic ratio of less than or equal to 60 enables the cation amount in the second separation membrane 40 to be sufficiently high. Although there is no limitation on the lower limit for the Si/Al atomic ratio of the low silica zeolite, a value of greater than or equal to 5 is preferred in light of membrane formation characteristics. The Si/Al atomic ratio of the low silica zeolite in the second separation membrane 40 can be adjusted by controlling the formulation of the starting material solution during hydrothermal synthesis as described below. The Si/Al atomic ratio of the low silica zeolite in the second separation membrane 40 can be measured by SEM-EDX.

The composite building units of the low silica zeolite contained in the second separation membrane 40 preferably share at least one of the composite building units of the high silica zeolite contained in first separation membrane 30. The composite building unit of the zeolite is a unit structure that configures the backbone structure of the zeolite. It is possible to enhance the adhesive characteristics of the first separation membrane 30 and the second separation membrane 40, the membrane formation characteristics of the second separation membrane 40, and the separation performance of the first separation membrane 30 and the second separation membrane 40 by including at least one common composite building unit. It is preferred that all the composite building units are shared when in a configuration in which the backbone structure of the low silica zeolite contained in the second separation membrane 40 is the same as the backbone structure of the high silica zeolite contained in the first separation membrane 30. Details of the composite building unit of zeolite are disclosed at The International Zeolite Association (IZA) "Database of Zeolite Structures" [online], [searched Nov. 21, 2014], Internet <URL: http://www.iza-structure.org/databases/>.

The second separation membrane 40 is formed into a membrane form. A configuration in which the second separation membrane 40 is formed in a membrane form enables further enhancement to the separation performance of the separation membrane structure 10 when compared to a configuration for example in which zeolite particles are fixed onto the surface 30S of the first separation membrane 30.

When the second separation membrane 40 is in a membrane shape, observation of a membrane cross section with STEM (scanning transmission electron microscope) enables confirmation that the second separation membrane 40 has a band-shaped distribution along the surface direction. In the present embodiment, if the second separation membrane 40 has a membrane shape, it means that greater than or equal to 80% of the surface 30S of the first separation membrane 30 is covered by the second separation membrane 40. It is particularly preferred that greater than or equal to 90% of the surface 30S of the first separation membrane 30 is covered by the second separation membrane 40. When the coverage of the second separation membrane 40 is high, it is possible to further improve the separation performance of the separation membrane structure 10.

There is no particular limitation in relation to the thickness of the second separation membrane 40, and for example it may be 0.1 micrometers to 3.0 micrometers. When the second separation membrane 40 is thin, there is a tendency for the permeation amount to increase, and when the second separation membrane 40 is thick, there is a tendency for the selectivity and membrane strength to be enhanced. When the thickness of the second separation membrane 40 is less than 0.1 micrometers, selectivity may be reduced, when it takes a value of greater than or equal to 3.0 micrometers, cracks are formed in the second separation layer and selectivity may be reduced.

The first separation membrane 30 includes pores. There is no particular limitation in relation to the average pore diameter of the second separation membrane 40 and it can be adjusted according to the object to be separated.

When in zeolite membrane configuration, the pore diameter is a value derived from the composition and backbone structure. When in zeolite membrane configuration, the average pore diameter is taken to be the arithmetic mean of the long diameter and short diameter of the largest pore in a pore structure of at least an oxygen 8-membered ring that is present in the backbone structure. The average pore diameter may be for example 0.2 nanometers to 2.0 nanometers.

When in a silica membrane or carbon membrane configuration, the average pore diameter can be adjusted by the starting material particle diameter or the heating temperature. The average pore diameter can be measured using a nano-perm porometer. The average pore diameter may be for example 0.2 nanometers to 5.0 nanometers.

Method of Manufacturing Zeolite Membrane Structure

A method of manufacturing a separation membrane structure 10 will be described.

Firstly, starting materials for a porous support 20 are molded into a desired shape by use of extrusion molding, a press molding method, a slip cast method, or the like.

Then, the green body for the porous support 20 is fired (for example, 900 degrees C. to 1450 degrees C.) and both end portions are sealed using glass to thereby form the porous support 20.

Next, a first separation membrane 30 having a main component of high silica zeolite is formed on the surface 20S of the porous support 20. Depending on the backbone structure of the zeolite membrane, the method of forming the first separation membrane 30 includes use of a known method such as a hydrothermal synthesis method. During the formation of the first separation membrane 30, zeolite seed crystal may be used or may not be used. The Si/Al atomic ratio of the high silica zeolite contained in the first separation membrane 30 can be adjusted to greater than or equal to 200 by the formulation of the starting material solution used in hydrothermal synthesis (including Si elemental atoms, Al elemental atoms, an organic template, and water). An organic template in the high silica zeolite may be combusted and removed after the formation of the first separation membrane 30 or may be combusted and removed after the formation of the second separation membrane 40. It is more preferred to combust and remove the organic template in the high silica zeolite after formation of the first separation membrane 30 since even when a defect is produced by removal of the organic template in the first separation membrane 30, the defect can be covered with the second separation membrane 40.

Next, the second separation membrane 40 is formed on the surface 30S of the first separation membrane 30. The method of forming the second separation membrane 40 includes use of a known method that is adapted to the membrane type in the second separation membrane 40. For example, when forming the second separation membrane 40 as low silica zeolite in a membrane configuration, a known method such as hydrothermal synthesis or the like may be used in response to the backbone structure of the zeolite membrane. In such a configuration, zeolite seed crystals may be used or may not be used. When an organic template is contained in the low silica zeolite, after combustion and removal of the organic template, it is possible to bring a solution containing a desired cation into contact with the low silica zeolite to thereby perform ion exchange. In this manner, low silica zeolite containing a desired cation can be obtained. The concentration or temperature of the solution containing the cation, or the time or number of the ion exchange operation can be suitably set. Since the low silica zeolite includes an ion exchange site, the cations are selectively introduced into the second separation membrane. The Si/Al atomic ratio of the low silica zeolite contained in the second separation membrane 40 can be adjusted to less than or equal to 60 by the composition ratio of the reactant mixture used during hydrothermal synthesis.

Incidentally, when an organic template is contained in the low silica zeolite, the nitrogen gas permeation rate of the low silica zeolite before combustion and removal of the organic template is preferably less than or equal to 0.75 nmol/(m²·s·Pa). Furthermore, when an organic template is not used in the formation of the low silica zeolite (when an organic template is not contained in the low silica zeolite), it is preferred that the nitrogen gas permeation rate of the low silica zeolite after sufficient exposure of the low silica zeolite to a saturated water vapor atmosphere is preferably less than or equal to 0.75 nmol/(m²·s·Pa). A nitrogen gas permeation rate of less than or equal to 0.75 nmol/(m²·s·Pa) means that the low silica zeolite is formed in a membrane configuration.

Examples

Examples of a separation membrane structure according to the present invention will be described below. However, the present invention is not limited to the examples that are described below.

Preparation of Sample No. 1

A separation membrane structure according to Sample No. 1 is prepared as described below.

Firstly 20 parts by weight of an inorganic binding material 20 is added to 100 parts by weight of alumina particles having an average particle diameter of 30 micrometers, and then water, a dispersant and a thickener are added and kneaded to prepare a porous material.

Then the prepared porous material is subjected to extrusion molding to form a green body for a monolithic alumina substrate. Next, the alumina substrate green body is fired (1250 degrees C., 1 hour) to form an alumina substrate. Then, PVA (organic binder) is added to alumina to prepare a slurry, and a green body for the surface layer is formed on the inner cell surface of the alumina substrate by filtration of the slurry. Then, after the green body for the surface layer is fired (1250 degrees C., 1 hour), both ends of the alumina substrate are sealed with glass to thereby prepare a monolithic alumina support.

Figure 2:
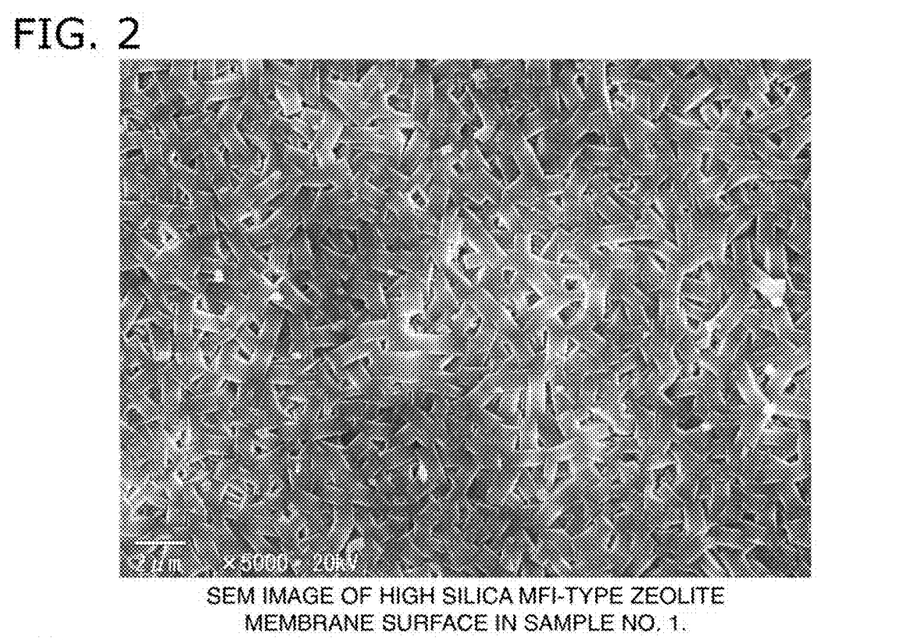
FIG. 2 is an SEM image of a surface of a high silica MFI-type zeolite membrane according to Sample No. 1.

Next, a high silica MFI-type zeolite membrane is formed as a first separation membrane on the inner cell surface of the alumina support. More specifically, firstly, an MFI-type zeolite seed crystal (Si/Al atomic ratio ≥200) is diluted with ethanol, and the seed slurry solution prepared to have a concentration of 0.1 mass % is caused to flow into the cell. Next, the inner portion of the cell is air-dried under predetermined conditions (room temperature, air velocity 5 m/s, 10 min). Next, after mixing 0.86 g of 40 mass % tetrapropylammonium hydroxide solution (manufactured by SACHEM, Inc.) and 0.45 g of tetrapropylammonium bromide (manufactured by Wako Pure Chemical Industries), 192.0 g of distilled water and 6.75 g of about 30 mass % silica sol (trade name: Snowtex S, manufactured by Nissan chemical Industries, Ltd.) are added and stirred with a magnetic stirrer (room temperature, 30 minutes) to prepare a sol for membrane formation. The resulting membrane-forming sol is placed in a fluororesin inner cylinder (internal volume 300 ml) of a stainless steel pressure vessel and then the alumina support with MFI-type zeolite seed crystals attached is immersed and reacted for 20 hours in a hot air drying apparatus at a temperature of 160 degrees C. to thereby form a high silica MFI-type zeolite membrane. Then, the alumina support is washed and dried for greater than or equal to 12 hours at 80 degrees C. Then, the alumina support is heated to 500 degrees C. in an electric furnace and retained for 4 hours to remove the tetrapropylammonium from the high silica MFI-type zeolite membrane. An SEM (scanning electron microscope) image of the high silica MFI-type zeolite membrane surface in Sample No. 1 is shown in FIG. 2.

Figure 3:
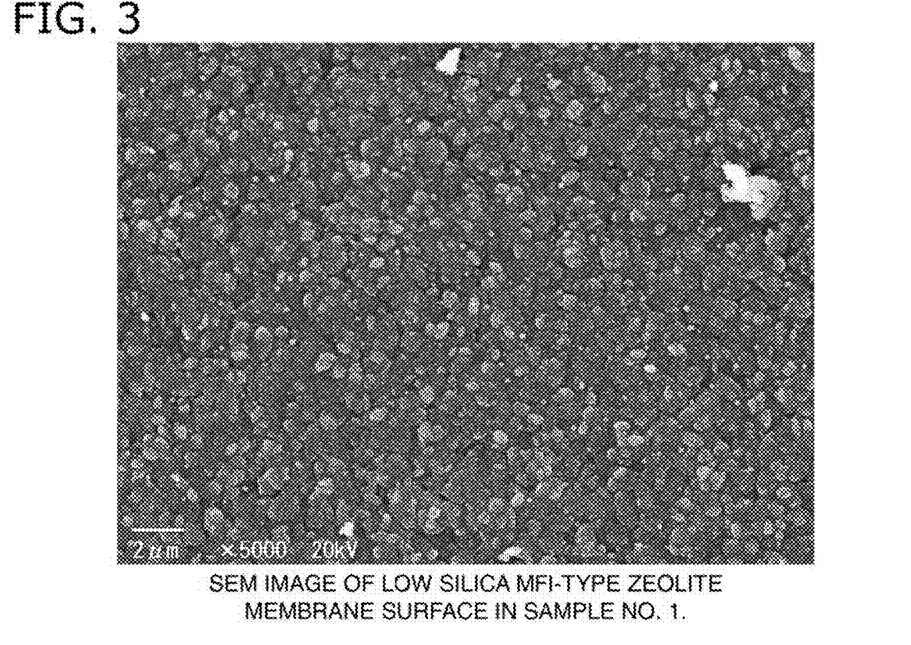
FIG. 3 is an SEM image of a surface of a low silica MFI-type zeolite membrane according to Sample No. 1.

Next, a low silica MFI-type zeolite membrane is formed as a second zeolite membrane on the surface of the high silica MFI type zeolite membrane. More specifically, after mixing 6.28 g of 40 mass % tetrapropylammonium hydroxide solution (manufactured by SACHEM, Inc.), 4.97 g of tetrapropylammonium bromide (manufactured by Wako Pure Chemical Industries), 26.3 g of sodium hydroxide (manufactured by Sigma-Aldrich), and 0.54 g of aluminum sulfate (manufactured by Wako Pure Chemical Industries), 147.1 g of distilled water and 14.8 g of about 30 mass % silica sol (trade name: Snowtex S, manufactured by Nissan chemical Industries, Ltd.) are added and stirred with a magnetic stirrer (room temperature, 30 minutes) to prepare a sol for membrane formation. After the resulting membrane-forming sol is placed in a fluororesin inner cylinder (internal volume 300 ml) of a stainless steel pressure vessel, the alumina support forming the high silica MFI-type zeolite membrane is immersed and reacted for 10 hours in a hot air drying apparatus at a temperature of 160 degrees C. to thereby form a low silica MFI-type zeolite membrane. Then, the alumina support is washed and dried for greater than or equal to 12 hours at 80 degrees C. Then, the alumina support is heated to 500 degrees C. in an electric furnace and retained for 4 hours to remove the tetrapropylammonium from the low silica MFI-type zeolite membrane. An SEM image of the low silica MFI-type zeolite membrane surface in Sample No. 1 is shown in FIG. 3.

Then, an ion exchange solution that is adjusted to 0.1 mol/L by adding water to silver nitrate (manufactured by Kanto Chemical) is retained for 24 hours in contact with the low silica MFI-type zeolite membrane to thereby introduce Ag as cation into the low silica MFI-type zeolite membrane. Thereafter, the low silica MFI-type zeolite membrane is rinsed with water and dried (70 degrees C., 12 hours).

Preparation of Sample No. 2 to Sample No. 8

Firstly, an alumina support that is the same as Sample No. 1 is prepared.

Next, a high silica MFI-type zeolite membrane that is the same as Sample No. 1 is formed as the first separation membrane on an inner cell surface of the alumina support. In Sample No. 3, the reaction time is adjusted to configure the membrane thickness to a greater value than Sample No. 1.

Then, a low silica MFI-type zeolite membrane that is the same as Sample No. 1 is formed as the second separation membrane on the surface of the high silica MFI-type zeolite membrane. However in Sample Nos. 3 to 8, the composition ratio of the membrane forming sol is adjusted to thereby vary the Si/Al atomic ratio. Furthermore, in Sample Nos. 2 to 8, the concentration or reaction time of the membrane forming sol is adjusted so that the membrane thickness is greater than or less than Sample No. 1.

Next, in the same manner as Sample No. 1, Ag is introduced as cation into the low silica MFI-type zeolite membrane.

Preparation of Sample No. 9

Firstly, an alumina support that is the same as Sample No. 1 is prepared.

Next, a high silica MFI-type zeolite membrane that is the same as Sample No. 1 is formed as the first separation membrane on an inner cell surface of the alumina support.

Then, a low silica MFI-type zeolite membrane that is the same as Sample No. 1 is formed as the second separation membrane on the surface of the high silica MFI-type zeolite membrane.

Then, an Li ion exchange solution that is adjusted to 0.1 mol/L by adding water to silver nitrate (manufactured by Kanto Chemical) is retained for 24 hours in contact with the high silica MFI-type zeolite membrane to thereby introduce Li as cation into the high silica MFI-type zeolite membrane. Thereafter, the high silica MFI-type zeolite membrane is rinsed with water and dried (70 degrees C., 12 hours).

Preparation of Sample No. 10

Firstly an alumina support is prepared that is the same as Sample No. 1.

Next, a high silica MFI-type zeolite membrane that is the same as Sample No. 1 is formed as the first separation membrane on an inner cell surface of the alumina support. In Sample No. 10, the reaction time or concentration of the membrane-forming sol is adjusted to configure the membrane thickness to less than Sample No. 1.

Then, a low silica BEA-type zeolite membrane is formed as the second separation membrane on the surface of the high silica MFI-type zeolite membrane. More specifically, firstly 24.3 g of 35 mass % tetraethylammonium hydroxide (manufactured by Sigma-Aldrich), 1.6 g of sodium aluminate acid, 143.1 g of distilled water and 31.0 g of approximately 30 mass % of a silica sol (trade name: Snowtex S, manufactured by Nissan Chemical) are mixed and stirred with a magnetic stirrer (room temperature, 90 minutes) to prepare a sol for membrane formation. After placing the resulting membrane-forming sol in a fluororesin inner cylinder (internal volume 300 ml) of a stainless steel pressure vessel, the alumina support forming the high silica MFI-type zeolite membrane is immersed and reacted for 10 hours in a hot air drying apparatus at a temperature of 140 degrees C. to thereby form a low silica BEA-type zeolite membrane. Then, the alumina support is washed and dried for greater than or equal to 12 hours at 80 degrees C. Then, the alumina support is heated to 500 degrees C. in an electric furnace and retained for 4 hours to remove the tetraethylammonium from the low silica BEA-type zeolite membrane.

Next, in the same manner as Sample No. 1, Ag is introduced as cation into the low silica BEA-type zeolite membrane.

Preparation of Sample No. 11

Firstly, an alumina support that is the same as Sample No. 1 is prepared.

Next, a high silica MFI-type zeolite membrane that is the same as Sample No. 1 is formed as the first separation membrane on an inner cell surface of the alumina support.

Then, a low silica BEA-type zeolite membrane that is the same as Sample No. 10 is formed as a second separation membrane on the surface of the high silica MFI-type zeolite membrane. In Sample No. 11, the composition ratio of the membrane-forming sol is adjusted so that the Si/Al atomic ratio is greater than Sample No. 10. Furthermore, in Sample No. 11, the concentration or reaction time of the membrane-forming sol is adjusted so that the membrane thickness is greater than Sample No. 10.

Next, in the same manner as Sample No. 10, Ag is introduced as cation into the low silica BEA-type zeolite membrane.

Preparation of Sample No. 12

Firstly, an alumina support that is the same as Sample No. 1 is prepared.

Then, a high silica BEA-type zeolite membrane is formed as the first separation membrane on an inner cell surface of the alumina support. More specifically, 85.1 g of 35 mass % tetraethylammonium solution, 33.9 g of distilled water and 81.0 g of approximately 30 mass % of a silica sol (trade name: Snowtex S, manufactured by Nissan Chemical) are added and stirred with a magnetic stirrer (room temperature, 90 minutes) to prepare a sol for membrane formation. After placing the resulting membrane-forming sol in a fluororesin inner cylinder (internal volume 300 ml) of a stainless steel pressure vessel, the alumina support is immersed and reacted for 24 hours in a hot air drying apparatus at a temperature of 140 degrees C. to thereby form a high silica BEA-type zeolite membrane. Then, the alumina support is washed and dried for greater than or equal to 12 hours at 80 degrees C. Then, the alumina support is heated to 500 degrees C. in an electric furnace and retained for 4 hours to remove the tetraethylammonium from the high silica BEA-type zeolite membrane.

Then, a low silica BEA-type zeolite membrane that is the same as Sample No. 10 is formed as a second separation membrane on the surface of the high silica BEA-type zeolite membrane.

Next, in the same manner as Sample No. 10, Ag is introduced as cation into the low silica BEA-type zeolite membrane.

Preparation of Sample No. 13

Firstly, an alumina support that is the same as Sample No. 1 is prepared.

Then, a high silica MFI-type zeolite membrane that is the same as Sample No. 1 is formed as the first separation membrane on the inner cell surface of the alumina support.

Next, a silica membrane containing low silica MFI is formed as a second separation membrane on the surface of the high silica MFI-type zeolite membrane. More specifically, an MFI-type zeolite powder (Si/Al atomic ratio=20) is dispersed in a silica sol solution prepared by hydrolysis of tetraethoxysilane in ethanol to form a coating solution having a 1% solid component. After coating and drying the coating solution on the surface of the high silica MFI-type zeolite membrane, firing is performed in an atmosphere of air for one hour at 400 degrees C. The coating and firing operation of the coating solution is repeated until the membrane thickness of the second separation membrane reaches 1 micrometer.

Next, in the same manner as Sample No. 1, Ag is introduced as cation into the zeolite-containing silica membrane.

Preparation of Sample No. 14

Firstly, an alumina support that is the same as Sample No. 1 is prepared.

Then, a high silica MFI-type zeolite membrane that is the same as Sample No. 13 is formed as the first separation membrane on the inner cell surface of the alumina support.

Next, a silica membrane containing low silica MFI that is the same as Sample No. 13 is formed as a second separation membrane on the surface of the high silica MFI-type zeolite membrane. In Sample No. 14, an MFI-type zeolite powder (Si/Al atomic ratio=60) that has a larger Si/Al atomic ratio than Sample No. 13 is used. In Sample No. 14, the number of the coating and firing operation of the coating solution is adjusted so that the membrane thickness is less than Sample No. 13.

Next, in the same manner as Sample No. 13, Ag is introduced as cation into the low silica MFI-containing silica membrane.

Preparation of Sample No. 15

Firstly, an alumina support that is the same as Sample No. 1 is prepared.

Then, a high silica MFI-type zeolite membrane that is the same as Sample No. 1 is formed as the first separation membrane on the inner cell surface of the alumina support.

Next, an organic silica membrane is formed as a second separation membrane on the surface of the high silica MFI-type zeolite membrane. More specifically, 24.0 g of a 25% aqueous solution of carboxyethyl silane triol sodium salt, 72.9 g of distilled water, and 3.0 g of 60% nitric acid are added and stirred using a magnetic stirrer (60 degrees C., 6 hours) to thereby form a coating solution. After coating and drying the coating solution on the high silica MFI-type zeolite membrane, firing is performed in an atmosphere of air for two hours at 150 degrees C.

Next, in the same manner as Sample No. 1, Ag is introduced as cation into the organic silica membrane.

Preparation of Sample No. 16

Firstly, an alumina support that is the same as Sample No. 1 is prepared.

Next, a high silica DDR-type zeolite membrane is formed as a first separation membrane on the inner cell surface of the alumina support. More specifically, firstly, a DDR-type zeolite seed crystal (Si/Al atomic ratio ≥200) is diluted with ethanol, and the seed slurry solution prepared to have a concentration of 0.1 mass % is caused to flow into the cells of the alumina support. Next, the inner portion of the cells is air-dried under predetermined conditions (room temperature, air velocity 5 m/s, 10 min). Next, after placing 7.35 g of ethylene diamine (manufactured by Wako Pure Chemical Industries, Ltd.) in a fluororesin wide-mouthed container, 1.16 g of 1-adamantane amine (manufactured by Aldrich) is added and dissolved so that there is no residual precipitate of 1-adamantane amine. Then, 98.0 g of 30 wt % silica sol (Trade name: Snowtex S, manufactured by Nissan Chemical Industries, Ltd.) and 116.5 g of distilled water are added to a separate container, stirred gently, and then added to the wide-mouth container and mixed by strong shaking to thereby prepare a sol for membrane formation. The alumina support with the DDR-type zeolite seed crystals attached is placed in a fluororesin inner cylinder (internal volume 300 ml) of a stainless steel pressure vessel, the membrane-forming sol added and thermal processing is performed (hydrothermal synthesis: 130 degrees C., 10 hours) to thereby form a high silica DDR-type zeolite membrane. Then, the alumina support is washed and dried for greater than or equal to 12 hours at 80 degrees C. Next, the alumina support is heated to 450 degrees C. in an electric furnace and retained for 50 hours to thereby combust and remove the 1-adamantane amine from the high silica DDR-type zeolite membrane.

Next, a low silica DDR-type zeolite membrane is formed as a second separation membrane on the surface of the high silica DDR-type zeolite membrane. More specifically, firstly, after placing 152.4 g of distilled water in a fluororesin wide-mouthed container, 1.32 g of 1-adamantane amine (manufactured by Aldrich), 0.35 g sodium hydroxide (manufactured by Sigma-Aldrich), 52.6 g of 30 wt % silica sol (Trade name Snowtex S, Nissan chemical Industries, Ltd.) and 0.36 g of sodium aluminate acid (manufactured by Wako Pure Chemical Industries, Ltd.) are added and stirred to form membrane-forming sol. After placing the alumina support forming the high silica DDR-type zeolite membrane in a fluororesin inner cylinder (internal volume 300 ml) of a stainless steel pressure vessel, an adjusted starting material solution is added and thermal processing is performed (hydrothermal synthesis: 160 degrees C., 10 hours) to thereby form a low silica DDR-type zeolite membrane. Then, the alumina support is washed and dried for greater than or equal to 12 hours at 80 degrees C. Next, the alumina support is heated to 450 degrees C. in an electric furnace and retained for 50 hours to thereby combust and remove the 1-adamantane amine from the low silica DDR-type zeolite membrane.

Next, in the same manner as Sample No. 9, Li is introduced as cation into the low silica DDR-type zeolite membrane.

Preparation of Sample No. 17

Firstly, an alumina support that is the same as Sample No. 1 is prepared.

Next, a high silica DDR-type zeolite membrane that is the same as Sample No. 16 is formed as a first separation membrane on the inner cell surface of the alumina support.

Next, a low silica DDR-type zeolite membrane that is the same as Sample No. 16 is formed as a second separation membrane on the surface of the high silica DDR-type zeolite membrane.

Then, an ion exchange solution that is adjusted to 0.1 mol/L by adding water to cesium chloride (manufactured by Wako Pure Chemical Industries, Ltd.) is retained for 24 hours in contact with the low silica DDR-type zeolite membrane to thereby introduce Cs as cation into the low silica DDR-type zeolite membrane. Thereafter, the low silica DDR-type zeolite membrane is rinsed with water and dried (70 degrees C., 12 hours).

Preparation of Sample No. 18

Firstly, an alumina support that is the same as Sample No. 1 is prepared.

Next, a high silica DDR-type zeolite membrane that is the same as Sample No. 16 is formed as a first separation membrane on the inner cell surface of the alumina support.

Next, a low silica DDR-type zeolite membrane that is the same as Sample No. 16 is formed as a second separation membrane on the surface of the high silica DDR-type zeolite membrane.

Then, an ion exchange solution that is adjusted to 0.1 mol/L by adding water to calcium chloride (manufactured by Wako Pure Chemical Industries, Ltd.) is retained for 24 hours in contact with the low silica DDR-type zeolite membrane to thereby introduce Ca as cation into the low silica DDR-type zeolite membrane. Thereafter, the low silica DDR-type zeolite membrane is rinsed with water and dried (70 degrees C., 12 hours).

Preparation of Sample No. 19

Firstly, an alumina support that is the same as Sample No. 1 is prepared.

Next, a high silica DDR-type zeolite membrane that is the same as Sample No. 16 is formed as a first separation membrane on the inner cell surface of the alumina support.

Next, a low silica DDR-type zeolite membrane that is the same as Sample No. 16 is formed as a second separation membrane on the surface of the high silica DDR-type zeolite membrane.

Then, an ion exchange solution that is adjusted to 0.1 mol/L by adding paladium chloride (manufactured by Tokyo Chemical Industry Co., Ltd.) to water that includes addition of hydrochloric acid (manufactured by Wako Pure Chemical Industries, Ltd.) is retained for 24 hours in contact with the low silica DDR-type zeolite membrane to thereby introduce Pd as cation into the low silica DDR-type zeolite membrane. Thereafter, the low silica DDR-type zeolite membrane is rinsed with water and dried (70 degrees C., 12 hours).

Preparation of Sample No. 20

Firstly, an alumina support that is the same as Sample No. 1 is prepared.

Next, a high silica DDR-type zeolite membrane that is the same as Sample No. 16 is formed as a first separation membrane on the inner cell surface of the alumina support. In Sample No. 20, the reaction time and the concentration of the membrane-forming sol are adjusted so that the membrane thickness is greater than Sample No. 16.

Then, a low silica DDR-type zeolite membrane that is the same as Sample No. 16 is formed as a second separation membrane on the surface of the high silica DDR-type zeolite membrane. In Sample No. 20, the composition ratio of the membrane-forming sol is adjusted so that the Si/Al atomic ratio is greater than Sample No. 16.

Next, in the same manner as Sample No. 1, Ag is introduced as cation into the low silica DDR-type zeolite membrane.

Preparation of Sample No. 21

Firstly, an alumina support that is the same as Sample No. 1 is prepared.

Next, a high silica MFI-type zeolite membrane that is the same as Sample No. 10 is formed as a first separation membrane on the inner cell surface of the alumina support.

Then, a low silica DDR-type zeolite membrane that is the same as Sample No. 16 is formed as a second separation membrane on the surface of the high silica MFI-type zeolite membrane. In Sample No. 21, the reaction time and the concentration of the membrane-forming sol are adjusted so that the membrane thickness is greater than Sample No. 16.

Next, in the same manner as Sample No. 16, Li is introduced as cation into the low silica DDR-type zeolite membrane.

Preparation of Sample No. 22

Firstly, an alumina support that is the same as Sample No. 1 is prepared.

Next, a high silica MFI-type zeolite membrane that is the same as Sample No. 21 is formed as a first separation membrane on the inner cell surface of the alumina support.

Then, a low silica DDR-type zeolite membrane that is the same as Sample No. 20 is formed as a second separation membrane on the surface of the high silica MFI-type zeolite membrane.

Next, in the same manner as Sample No. 20, Ag is introduced as cation into the low silica DDR-type zeolite membrane.

Preparation of Sample No. 23

Firstly, an alumina support that is the same as Sample No. 1 is prepared.

Next, a low silica MFI-type zeolite membrane is formed as a first separation membrane on the inner cell surface of the alumina support. More specifically, firstly, a low silica MFI-type zeolite seed crystal (Si/Al atomic ratio=20) is diluted with ethanol, and the seed slurry solution prepared to have a concentration of 0.1 mass % is caused to flow into the cells of the alumina support. Next, the inner portion of the cell is air-dried under predetermined conditions (room temperature, air velocity 5 m/s, 10 min). Next, after mixing 6.28 g of 40 mass % tetrapropylammonium hydroxide solution (manufactured by SACHEM, Inc.), 4.97 g of tetrapropylammonium bromide (manufactured by Wako Pure Chemical Industries), 26.3 g of sodium hydroxide (manufactured by Sigma-Aldrich), and 0.54 g of ammonium sulfate (manufactured by Wako Pure Chemical Industries), 147.1 g of distilled water and 14.8 g of about 30 mass % silica sol (trade name: Snowtex S, manufactured by Nissan chemical Industries, Ltd.) are added and stirred with a magnetic stirrer (room temperature, 30 minutes) to prepare a sol for membrane formation. The resulting membrane-forming sol is placed in a fluororesin inner cylinder (internal volume 300 ml) of a stainless steel pressure vessel and then the alumina support with the zeolite seed crystals attached is immersed and reacted for 32 hours in a hot air drying apparatus at a temperature of 160 degrees C. to thereby form a low silica MFI-type zeolite membrane. Then, the alumina support is washed and dried for greater than or equal to 12 hours at 80 degrees C. Then, the alumina support is heated to 500 degrees C. in an electric furnace and retained for 4 hours to remove the tetrapropylammonium from the low silica MFI-type zeolite membrane.

Next, without forming the second separation membrane, Ag is introduced as cation into the low silica MFI-type zeolite membrane in the same manner as Sample No. 1.

Preparation of Sample No. 24

Firstly, an alumina support that is the same as Sample No. 1 is prepared.

Next, a low silica DDR-type zeolite membrane is formed as a first separation membrane on the inner cell surface of the alumina support. More specifically, firstly, a low silica DDR-type zeolite seed crystal (Si/Al atomic ratio=40) is diluted with ethanol, and the seed slurry solution prepared to have a concentration of 0.1 mass % is caused to flow into the cells of the alumina support. Next, the inner portion of the cell is air-dried under predetermined conditions (room temperature, air velocity 5 m/s, 10 min). Next, after placing 152.4 g of distilled water in a fluororesin wide-mouthed container, 1.32 g of 1-adamantane amine (manufactured by Aldrich), 0.35 g sodium hydroxide (manufactured by Sigma-Aldrich), 52.6 g of 30 wt % silica sol (Trade name Snowtex S, Nissan chemical Industries, Ltd.) and 0.36 g of sodium aluminate acid (manufactured by Wako Pure Chemical Industries, Ltd.) are added. The wide-mouthed container is attached to an homogenizer and stirred for one hour. Then, after placing the alumina support with the DDR-type zeolite seed crystals attached in a fluororesin inner cylinder (internal volume 300 ml) of a stainless steel pressure vessel, an adjusted starting material solution is added and thermal processing is performed (hydrothermal synthesis: 160 degrees C., 48 hours) to thereby form a low silica DDR-type zeolite membrane. Then, the alumina support is washed and dried for greater than or equal to 12 hours at 80 degrees C. Next, the alumina support is heated to 450 degrees C. in an electric furnace and retained for 50 hours to thereby combust and remove the 1-adamantane amine from the low silica DDR-type zeolite membrane.

Next, without forming the second separation membrane, Li is introduced as cation into the low silica DDR-type zeolite membrane in the same manner as Sample No. 16.

Preparation of Sample No. 25

Firstly, an alumina support that is the same as Sample No. 1 is prepared.

Next, a low silica DDR-type zeolite membrane that is the same as Sample No. 24 is formed as a first separation membrane on the inner cell surface of the alumina support.

Next, without forming the second separation membrane, Ag is introduced as cation into the low silica DDR-type zeolite membrane in the same manner as Sample No. 20.

Preparation of Sample No. 26

Firstly, an alumina support that is the same as Sample No. 1 is prepared.

Next, a high silica MFI-type zeolite membrane that is the same as Sample No. 10 is formed as a first separation membrane on the inner cell surface of the alumina support.

Next, in accordance with the method disclosed in Japanese Patent Application Laid-Open No. 2005-289735, a low silica LTA-type zeolite is fixed to the surface of the high silica MFI-type zeolite membrane. More specifically, firstly, 0.72 g sodium hydroxide (manufactured by Wako Pure Chemical Industries), is completely dissolved in 80 g of distilled water to obtain a solution A. Then, 8.26 g of sodium aluminate acid (manufactured by Nacalai) is added to half of solution A and completely dissolved to obtain solution B. Next, sodium silicate (manufactured by Wako Pure Chemical Industries) is added to the remaining half of solution A and completely dissolved to obtain solution C. Solution C is added to solution B to obtain a turbid solution as a starting material solution. Then, the starting material solution is dip coated, transferred to a steam oven (model BL-400 manufactured by Densoku) and subjected to hydrothermal synthesis (90 degrees C., 20 minutes) to form a low silica LTA-type zeolite. However, the low silica LTA-type zeolite does not cover greater than or equal to 80% of the surface of the high silica MFI-type zeolite membrane and is not formed in a membrane configuration.

Next, Ag is introduced as cation into the low silica LTA-type zeolite in the same manner as Sample No. 1.

Preparation of Sample No. 27

Firstly, an alumina support that is the same as Sample No. 1 is prepared.

Next, a high silica MFI-type zeolite membrane that is the same as Sample No. 1 is formed as a first separation membrane on the inner cell surface of the alumina support.

Next, a low silica LTA-type zeolite is fixed to the surface of the high silica MFI-type zeolite membrane.

Next, Ag is introduced as cation into the low silica LTA-type zeolite in the same manner as Sample No. 26.

Preparation of Sample No. 28

Firstly, an alumina support that is the same as Sample No. 1 is prepared.

Next, a high silica MFI-type zeolite membrane that is the same as Sample No. 10 is formed as a first separation membrane on the inner cell surface of the alumina support.

Then, without forming the second separation membrane, an Ag ion exchange solution that is adjusted in the same manner as Sample No. 1 is retained for 24 hours in contact with the high silica MFI-type zeolite membrane. Thereafter, the high silica MFI-type zeolite membrane is rinsed with water and dried (70 degrees C., 12 hours). However, since the high silica MFI-type zeolite membrane does not have an ion exchange site, Ag is not introduced into the first separation membrane.

Preparation of Sample No. 29

Firstly, an alumina support that is the same as Sample No. 1 is prepared.

Next, a high silica MFI-type zeolite membrane that is the same as Sample No. 1 is formed as a first separation membrane on the inner cell surface of the alumina support.

Then, without forming the second separation membrane, an Ag ion exchange solution that is adjusted in the same manner as Sample No. 1 is retained for 24 hours in contact with the high silica MFI-type zeolite membrane. Thereafter, the high silica MFI-type zeolite membrane is rinsed with water and dried (70 degrees C., 12 hours). However, since the high silica MFI-type zeolite membrane does not have an ion exchange site, Ag is not introduced into the first separation membrane.

Preparation of Sample No. 30

Firstly, an alumina support that is the same as Sample No. 1 is prepared.

Next, a high silica MFI-type zeolite membrane that is the same as Sample No. 10 is formed as a first separation membrane on the inner cell surface of the alumina support.

Next, a high silica DDR-type zeolite membrane is formed as a second separation membrane on the surface of the high silica MFI-type zeolite membrane. More specifically, firstly, a DDR-type zeolite seed crystal (Si/Al atomic ratio r 200) is diluted with ethanol, and the seed slurry solution prepared to have a concentration of 0.1 mass % is caused to flow into the cells of the alumina support. Next, the inner portion of the cells is air-dried under predetermined conditions (room temperature, air velocity 5 m/s, 10 min). Next, after placing 7.35 g of ethylene diamine (manufactured by Wako Pure Chemical Industries, Ltd.) in a fluororesin wide-mouthed container, 1.16 g of 1-adamantane amine (manufactured by Aldrich) is added and dissolved so that there is no residual precipitate of 1-adamantane amine. Then, 98.0 g of 30 wt % silica sol (Trade name: Snowtex S, manufactured by Nissan Chemical industries, Ltd.) and 116.5 g of distilled water are added to a separate container, stirred gently, and then added to the wide-mouth container and mixed by strong shaking to thereby prepare a starting material solution. Then the alumina support forming high silica MFI-type zeolite membrane is placed in a fluororesin inner cylinder (internal volume 300 ml) of a stainless steel pressure vessel, the prepared starting material solution is added, and thermal processing is performed (hydrothermal synthesis: 160 degrees C., 20 hours) to thereby form a high silica DDR-type zeolite membrane. Then, the alumina support is washed and dried for greater than or equal to 12 hours at 80 degrees C. Next, the alumina support is heated to 450 degrees C. in an electric furnace and retained for 50 hours to thereby combust and remove the 1-adamantane amine from the high silica DDR-type zeolite membrane.

Then, an Ag ion exchange solution that is adjusted in the same manner as Sample No. 1 is retained for 24 hours in contact with the high silica DDR-type zeolite membrane. Thereafter, the high silica MFI-type zeolite membrane is rinsed with water and dried (70 degrees C., 12 hours). However, since the high silica DDR-type zeolite membrane does not have an ion exchange site, Ag is not introduced into the second separation membrane.

Preparation of Sample No. 31

Firstly, an alumina support that is the same as Sample No. 1 is prepared.

Next, a high silica MFI-type zeolite membrane that is the same as Sample No. 1 is formed as a first separation membrane on the inner cell surface of the alumina support.

Then, a high silica DDR-type zeolite membrane that is the same as Sample No. 30 is formed as a second separation membrane on the surface of the high silica MFI-type zeolite membrane.

Next, without forming the second separation membrane, an Ag ion exchange solution that is adjusted in the same manner as Sample No. 1 is retained for 24 hours in contact with the high silica DDR-type zeolite membrane. Thereafter, the high silica DDR-type zeolite membrane is rinsed with water and dried (70 degrees C., 12 hours). However, since the high silica DDR-type zeolite membrane does not have an ion exchange site, Ag is not introduced into the second separation membrane.

Confirmation of Second Separation Membrane

Figure 4:
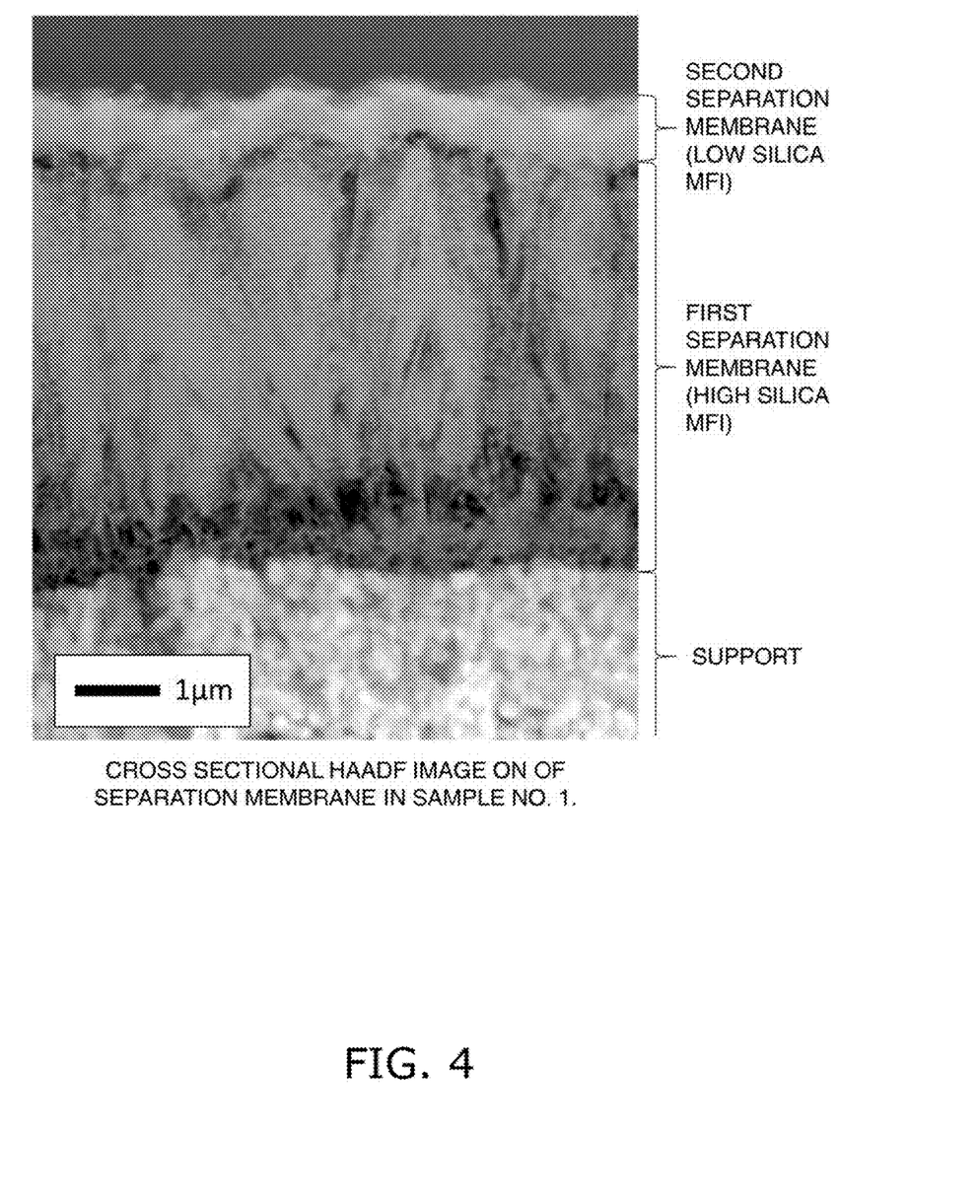
FIG. 4 is a HAADF image when using STEM to observe a separation membrane cross section according to Sample No. 1.

After mechanical polishing the cross sectional surface of the first separation membrane and the second separation membrane in Sample Nos. 1 to 22, 30, and 31, polishing is executed by use of an Ar ion milling (Dual Mill 600 manufactured by GATAN), and observation is performed using STEM (JEM2100F manufactured by JEOL, Ltd., acceleration voltage: 200 kV STEM beam diameter approximately 0.7 nmφ). As a result, the second separation membrane is confirmed to be formed in a membrane configuration in the above samples. A HAADF (high-angle scattering annular dark-field) image when a cross section of the separation membrane in Sample No. 1 was observed by STEM is shown in FIG. 4.

On the other hand, when Sample Nos. 26 and 27 are subjected to microscopic observation, it is confirmed that the LTA-type zeolite is not formed in a membrane configuration but rather with the powder in a dispersed configuration.

Separation Performance and Permeation Amount

The ethylene/ethane separation coefficient α and ethylene permeation performance is measured as described below in Sample Nos. 1 to 15, 20, 22, 23, 25 to 29, and 31. Firstly, a mixed gas (volume ratio of each gas=50:50) of ethylene ($C_2H_4$) and ethane ($C_2H_6$) at a temperature of 25 degrees C. is introduced into the cells at 0.4 MPa, and the flow amount of gas that permeates the first separation membrane and the second separation membrane is measured using gas chromatography. Furthermore, component analysis of the recovered gas recovered is performed by use of gas chromatography to thereby calculate a separation coefficient α from the ratio of the permeation rate for ethylene/ethane. The permeation rate is the gas flow amount permeating the first separation membrane and second separation membrane per unit pressure difference·unit surface area·unit time, and is expressed in units of [mol/($m^2$·s·Pa)].

The carbon dioxide/methane separation coefficient α and carbon dioxide permeation performance is measured as described below in Sample Nos. 16 to 18, 21, 24, 26, 28 and 30. Firstly, a mixed gas (volume ratio of each gas=50:50) of carbon dioxide and methane at a temperature of 25 degrees C. is introduced into the cells at 0.3 MPa, and the flow amount of gas that permeates the first separation membrane and the second separation membrane is measured using gas chromatography. Furthermore, component analysis of the recovered gas is performed by use of gas chromatography to thereby calculate a separation coefficient α from the ratio of the permeation rate for carbon dioxide/methane.

The hydrogen/oxygen separation coefficient α and hydrogen permeation performance is measured as described below in Sample Nos. 19 and 30. Firstly, a mixed gas (volume ratio of each gas=50:50) of hydrogen and oxygen at a temperature of 25 degrees C. is introduced into the cells at 0.3 MPa, and the flow amount of gas that permeates the first separation membrane and the second separation membrane is measured using gas chromatography. Furthermore, component analysis of the recovered gas is performed by use of gas chromatography to thereby calculate a separation coefficient α from the ratio of the permeation rate for hydrogen/oxygen.

TABLE 1

| SAMPLE NO. | FIRST SEPARATION MEMBRANE | | | SECOND SEPARATION MEMBRANE | | | | PRESENCE OF COMMON BUILDING UNIT | SEPARATION PERFORMANCE α (ETHYLENE/ETHANE) | ETHYLENE PERMEATION RATE (nmol/m²sPa) | SEPARATION PERFORMANCE α (CARBON DIOXIDE/METHANE) | CARBON DIOXIDE PERMEATION RATE (nmol/m²sPa) | SEPARATION PERFORMANCE α (HYDROGEN/OXYGEN) | HYDROGEN PERMEATION RATE (nmol/m²sPa) |
|---|---|---|---|---|---|---|---|---|---|---|---|---|---|---|
| | CRYSTAL STRUCTURE | MEMBRANE THICKNESS (μm) | ZEOLITE Si/Al RATIO | CRYSTAL STRUCTURE | MEMBRANE THICKNESS (μm) | ZEOLITE Si/Al RATIO | CATION | | | | | | | |
| 1 | HIGH SILICA MFI | 5 | AT LEAST 200 | HIGH SILICA MFI | 0.7 | 20 | Ag | YES | 130 | 48 | — | — | — | — |
| 2 | HIGH SILICA MFI | 5 | AT LEAST 200 | HIGH SILICA MFI | 0.1 | 20 | Ag | YES | 135 | 77 | — | — | — | — |
| 3 | HIGH SILICA MFI | 10 | AT LEAST 200 | HIGH SILICA MFI | 0.1 | 40 | Ag | YES | 130 | 48 | — | — | — | — |
| 4 | HIGH SILICA MFI | 5 | AT LEAST 200 | HIGH SILICA MFI | 0.1 | 70 | Ag | YES | 60 | 90 | — | — | — | — |
| 5 | HIGH SILICA MFI | 5 | AT LEAST 200 | HIGH SILICA MFI | 0.7 | 60 | Ag | YES | 111 | 61 | — | — | — | — |
| 6 | HIGH SILICA MFI | 5 | AT LEAST 200 | HIGH SILICA MFI | 3.0 | 60 | Ag | YES | 108 | 13 | — | — | — | — |
| 7 | HIGH SILICA MFI | 5 | AT LEAST 200 | HIGH SILICA MFI | 4.2 | 60 | Ag | YES | 39 | 105 | — | — | — | — |
| 8 | HIGH SILICA MFI | 5 | AT LEAST 200 | HIGH SILICA MFI | 0.7 | 100 | Ag | YES | 62 | 84 | — | — | — | — |
| 9 | HIGH SILICA MFI | 5 | AT LEAST 200 | HIGH SILICA MFI | 0.1 | 40 | Li | YES | 8 | 30 | — | — | — | — |
| 10 | HIGH SILICA MFI | 2 | AT LEAST 200 | HIGH SILICA MFI | 0.8 | 5 | Ag | YES | 61 | 149 | — | — | — | — |
| 11 | HIGH SILICA MFI | 5 | AT LEAST 200 | HIGH SILICA BEA | 1.0 | 50 | Ag | YES | 50 | 150 | — | — | — | — |
| 12 | HIGH SILICA BEA | 2 | AT LEAST 200 | HIGH SILICA MFI | 0.8 | 5 | Ag | YES | 81 | 113 | — | — | — | — |
| 13 | HIGH SILICA MFI | 5 | AT LEAST 200 | HIGH SILICA BEA | 1.0 | 20 | Ag | NO | 32 | 211 | — | — | — | — |
| 14 | HIGH SILICA MFI | 5 | AT LEAST CONTAINING LOW SILICA MFI | SILICA CONTAINING | 0.5 | 60 | Ag | NO | 10 | 200 | — | — | — | — |

TABLE 1-continued

| SAMPLE NO. | FIRST SEPARATION MEMBRANE | | | SECOND SEPARATION MEMBRANE | | | | PRESENCE OF COMMON BUILDING UNIT | SEPARATION PERFORMANCE α (ETHYLENE/ETHANE) | ETHYLENE PERMEATION RATE (nmol/m²sPa) | SEPARATION PERFORMANCE α (CARBON DIOXIDE/METHANE) | CARBON DIOXIDE PERMEATION RATE (nmol/m²sPa) | SEPARATION PERFORMANCE α (HYDROGEN/OXYGEN) | HYDROGEN PERMEATION RATE (nmol/m²sPa) |
|---|---|---|---|---|---|---|---|---|---|---|---|---|---|---|
| | CRYSTAL STRUCTURE | MEMBRANE THICKNESS (μm) | ZEOLITE Si/Al RATIO | CRYSTAL STRUCTURE | MEMBRANE THICKNESS (μm) | ZEOLITE Si/Al RATIO | CATION | | | | | | | |
| | MFI | | 200 | ING LOW SILICA MFI | | | | | | | | | | |
| 15 | HIGH SILICA MFI | 5 | AT LEAST 200 | ORGANIC SILICA | 1.0 | — | Ag | — | 11 | 23 | — | — | — | — |
| 16 | HIGH SILICA MFI | 1 | AT LEAST 200 | LOW SILICA DDR | 0.5 | 40 | Li | YES | — | — | 932 | 101 | — | — |
| 17 | HIGH SILICA DDR | 1 | AT LEAST 200 | LOW SILICA DDR | 0.5 | 40 | Ca | YES | — | — | 955 | 85 | — | — |
| 18 | HIGH SILICA DDR | 1 | AT LEAST 200 | LOW SILICA DDR | 0.5 | 40 | Ca | YES | — | — | 441 | 77 | — | — |
| 19 | HIGH SILICA MFI | 1 | AT LEAST 200 | LOW SILICA DDR | 0.5 | 40 | Pd | YES | — | — | — | — | 12 | 59 |
| 20 | HIGH SILICA DDR | 2 | AT LEAST 200 | LOW SILICA DDR | 0.5 | 60 | Ag | YES | 20 | 1 | — | — | — | — |
| 21 | HIGH SILICA DDR | 2 | AT LEAST 200 | LOW SILICA DDR | 1.0 | 40 | Li | NO | — | — | 56 | 153 | — | — |
| 22 | HIGH SILICA MFI | 5 | AT LEAST 200 | LOW SILICA DDR | 0.5 | 60 | Ag | NO | 11 | 1 | — | — | — | — |
| 23 | LOW SILICA DDR | 2 | 20 | — | — | — | Ag | — | 2 | 12 | — | — | — | — |
| 24 | LOW SILICA DDR | 2 | 40 | — | — | — | Li | — | — | — | 21 | 11 | — | — |
| 25 | LOW SILICA DDR | 2 | 40 | — | — | — | Ag | — | 2 | 0.04 | — | — | — | — |
| 26 | HIGH SILICA MFI | 2 | AT LEAST 200 | LOW SILICA LTA (POWDER STATE) | — | 1 | Ag | NO | 2 | 20 | 1 | 1430 | — | — |
| 27 | HIGH SILICA MFI | 5 | AT LEAST 200 | LOW SILICA LTA (POWDER | — | 1 | Ag | NO | 3 | 11 | — | — | — | — |

TABLE 1-continued

| SAMPLE NO. | FIRST SEPARATION MEMBRANE CRYSTAL STRUCTURE | MEMBRANE THICKNESS (μm) | ZEOLITE Si/Al RATIO | SECOND SEPARATION MEMBRANE CRYSTAL STRUCTURE | MEMBRANE THICKNESS (μm) | ZEOLITE Si/Al RATIO | CATION | PRESENCE OF COMMON BUILDING UNIT | SEPARATION PERFORMANCE α (ETHYLENE/ETHANE) | ETHYLENE PERMEATION RATE (nmol/m²sPa) | SEPARATION PERFORMANCE α (CARBON DIOXIDE/METHANE) | CARBON DIOXIDE PERMEATION RATE (nmol/m²sPa) | SEPARATION PERFORMANCE α (HYDROGEN/OXYGEN) | HYDROGEN PERMEATION RATE (nmol/m²sPa) |
|---|---|---|---|---|---|---|---|---|---|---|---|---|---|---|
| 28 | HIGH SILICA MFI | 2 | AT LEAST 200 | (STATE) — | — | — | — | — | 2 | 420 | 1 | 3310 | — | — |
| 29 | HIGH SILICA MFI | 5 | AT LEAST 200 | — | — | — | — | — | 2 | 300 | — | — | — | — |
| 30 | HIGH SILICA MFI | 2 | AT LEAST 200 | HIGH SILICA DDR | 1.0 | AT LEAST 200 | — | NO | — | — | 10 | 106 | 3 | 98 |
| 31 | HIGH SILICA MFI | 5 | AT LEAST 200 | HIGH SILICA DDR | 1.0 | AT LEAST 200 | — | NO | 3 | 1 | — | — | — | — |

As shown in Table 1, a sufficient separation performance and permeation amount is obtained in Sample Nos. 1 to 22 that form a second separation membrane that contains cation on the first separation membrane that contains high silica zeolite. This is due to the fact that the first separation membrane and second separation membrane function together as a separation membrane and enable adsorption of a permeation component by the cations in the second separation membrane.

As shown by a comparison of Sample No. 13 and Sample No. 15, separation performance has been enhanced in relation to Sample No. 13 in which the second separation membrane contains low silica zeolite. This feature is thought to result from the fact that a uniform pore diameter in the zeolite is effective in relation to separation performance.

As shown by a comparison of Sample No. 1 and Sample No. 13, when the second separation membrane contains low silica zeolite, the separation performance is improved in relation to Sample No. 1 in which the second separation membrane is configured by low silica zeolite. This feature is thought to result from the fact that since the whole of the second separation membrane is configured from zeolite, more effective separation is enabled by the uniform pore diameter of the zeolite.

As shown by a comparison of Sample Nos. 1, 5 and 8, when the first separation membrane and the second separation membrane are both zeolite membranes, the separation performance is enhanced in Sample Nos. 1 and 5 in which the Si/Al atomic ratio of the second separation membrane is less than or equal to 60. This feature is thought to result from the fact that the cation amount in the second separation membrane is sufficiently high.

As shown by a comparison of Sample No. 16 and Sample No. 21, when the first separation membrane and the second separation membrane are both zeolite membranes, the separation performance is enhanced in Sample No. 16 which shares composite building units.

As shown by a comparison of Sample No. 5 and Sample No. 11, the separation performance is enhanced in Sample No. 5 which is configured by the same zeolite in the backbone structure of the first separation membrane and the second separation membrane.

Although not included in the examples, a sample is separately prepared in which the membrane thickness of the first separation membrane is varied, and the feature that the permeation performance is enhanced by decreasing the membrane thickness of the first separation membrane is confirmed experimentally. In the same manner, it is confirmed experimentally that the permeation performance is enhanced by reducing the thickness of the second separation membrane.

The invention claimed is:

1. A separation membrane structure comprising:
   a porous support,
   a first separation membrane formed on the porous support and containing high silica zeolite having an Si/Al atomic ratio of greater than or equal to 200, and
   a second separation membrane formed on the first separation membrane and containing at least one cation,
   wherein the high silica zeolite contained in the first separation membrane is zeolite that has a backbone of any of DDR, MEL, BEA and CHA,
   wherein the second separation membrane contains low silica zeolite that has a smaller Si/Al atomic ratio than the high silica zeolite contained in the first separation membrane, and
   wherein composite building units of the high silica zeolite contained in the first separation membrane share at least one of composite building unit of the low silica zeolite contained in the second separation membrane.

2. The separation membrane structure according to claim 1, wherein
   the cation is at least one type of cation selected from the group consisting of alkali metals, alkaline earth metals, Au, Ag, Cu, Ni, Co, Pd and Pt.

3. The separation membrane structure according to claim 1, wherein
   a thickness of the second separation membrane is greater than or equal to 0.1 micrometers and less than or equal to 3.0 micrometers.

4. A separation membrane structure comprising:
   a porous support,
   a first separation membrane formed on the porous support and containing high silica zeolite having an Si/Al atomic ratio of greater than or equal to 200, and
   a second separation membrane formed on the first separation membrane and containing at least one cation,
   wherein the high silica zeolite contained in the first separation membrane is zeolite that has a backbone of any of DDR, MEL, BEA and CHA, and
   wherein a backbone structure of the high silica zeolite contained in the first separation membrane is the same as a backbone structure of the low silica zeolite contained in the second separation membrane.

5. The separation membrane structure according to claim 1, wherein the second separation membrane contains low silica zeolite that has an Si/Al atomic ratio of less than or equal to 60.

* * * * *